(12) United States Patent
Frank et al.

(10) Patent No.: US 10,396,537 B2
(45) Date of Patent: Aug. 27, 2019

(54) BUSWAY VERTICAL SPRING HANGER

(71) Applicant: SCHNEIDER ELECTRIC USA, INC., Andover, MA (US)

(72) Inventors: Bret L. Frank, Middletown, OH (US); Rodney J. West, Liberty, IN (US); Glenn S. O'Nan, Oxford, OH (US)

(73) Assignee: Schneider Electric USA, Inc., Andover, MA (US)

( * ) Notice: Subject to any disclaimer, the term of this patent is extended or adjusted under 35 U.S.C. 154(b) by 192 days.

(21) Appl. No.: 15/227,586

(22) Filed: Aug. 3, 2016

(65) Prior Publication Data

US 2018/0041016 A1 Feb. 8, 2018

(51) Int. Cl.
*H02G 5/02* (2006.01)
*F16M 13/02* (2006.01)

(52) U.S. Cl.
CPC .......... *H02G 5/025* (2013.01); *F16M 13/027* (2013.01)

(58) Field of Classification Search
CPC ........ H02G 5/025; F16M 13/027; E04B 9/18; E04B 9/225
USPC ......... 52/39, 573.1; 248/560, 562, 565, 577, 248/543
See application file for complete search history.

(56) References Cited

U.S. PATENT DOCUMENTS

| | | | | |
|---|---|---|---|---|
| 15,832 A * | 9/1856 | Wells | ..... | F27D 1/00 110/181 |
| 2,115,824 A * | 5/1938 | McRorey | ..... | E04H 9/021 254/98 |
| 3,226,472 A * | 12/1965 | Barnstead | ..... | H02G 5/06 174/100 |
| 3,311,365 A * | 3/1967 | Eckel | ..... | E04B 9/021 254/98 |
| 3,691,321 A * | 9/1972 | Rochefort | ..... | B60M 1/302 174/94 S |
| 3,769,774 A * | 11/1973 | Barnes | ..... | E04B 5/43 248/58 |
| 4,143,719 A * | 3/1979 | Furukawa | ..... | E02D 7/18 173/1 |
| 5,409,192 A * | 4/1995 | Oliver | ..... | E04L 31/34352 248/357 |
| 7,053,287 B2 * | 5/2006 | Dam | ..... | G10D 3/146 84/313 |

(Continued)

FOREIGN PATENT DOCUMENTS

CN 102231505 11/2011
DE 10159294 A1 * 6/2003 ............. H02G 5/025

(Continued)

OTHER PUBLICATIONS

Square D by Schneider Electric, "Busway Systems, Catalog, 5600CT9101R8/08, 2009, Class 5600", 138 total pages (including numbered pp. 19, 25-27 and 50), May 2009.

(Continued)

*Primary Examiner* — Kimberly T Wood
(74) *Attorney, Agent, or Firm* — Locke Lord LLP

(57) ABSTRACT

The present invention provides for a calculation and presetting of even spring compression among the spring hangers of a vertical busway riser, by use of rigid elements in the hanger with the ability to retain the spring compression during construction of the busway, and the ability to release and load the spring hangers only after construction of the riser is completed.

18 Claims, 4 Drawing Sheets

(56) References Cited

U.S. PATENT DOCUMENTS

| | | | | |
|---|---|---|---|---|
| 7,503,553 | B2 * | 3/2009 | Brannan | B62D 33/10 267/248 |
| 8,291,650 | B2 * | 10/2012 | Vreeland | E04H 9/021 248/562 |
| 9,732,887 | B2 * | 8/2017 | Zhang | F16L 3/24 |
| 2012/0104220 | A1 * | 5/2012 | Korson | B60D 1/62 248/577 |
| 2016/0069480 | A1 * | 3/2016 | Rego | F16B 5/065 248/65 |
| 2017/0138510 | A1 * | 5/2017 | Kim | F16M 13/027 |

FOREIGN PATENT DOCUMENTS

| | | | | |
|---|---|---|---|---|
| EP | 0547473 | | 12/1992 | |
| EP | 1589627 | A1 * | 10/2005 | H02G 5/025 |
| EP | 2479355 | A1 * | 7/2012 | E04B 9/183 |

OTHER PUBLICATIONS

English language machine translation of CN102231505, 5 pages.
English language machine translation of EP0547473, 14 pages.

\* cited by examiner

BUSWAY VERTICAL SPRING HANGER

FIELD OF THE INVENTION

The present disclosure relates to a method and apparatus for constructing the vertical riser in a busway system and more particularly to methods and apparatus for balancing the load between the vertical spring hangers suspending the vertical riser.

BACKGROUND OF THE INVENTION

Busways for electrical distribution systems are commonly understood in the art to include multiple factory assembled metal enclosed raceways containing individually insulated, usually flat, electrical conductors or busbars fastened together by conductive joints. The individual sections are designed to be easily connected together, both electrically and mechanically, end-to-end to form any desired length.

Where the need arises for the electrical supply to extend vertically, most commonly in multistory buildings, the busway sections are connected on top of each other to create a vertical riser bringing electricity to each floor. The riser must be supported. In indoor riser applications, for example, support for busway must be provided at intervals not exceeding 16 ft. (488 cm). Vertical Spring hangers, also referred to as just "spring hangers," are recommended for such busway riser applications. Each hanger for the riser must be anchored to a floor or some horizontal structure in the building. When properly installed and maintained, spring hangers compensate for expansion and contraction of the busway, as well as shrinkage of the building.

However, current busway spring hanger designs do not prevent transfer loading of the riser weight to other floors and hangers during the installation process of the busway. For example, each hanger has springs but the springs may bottom out and lose utility if the load is not carefully calculated or constructed to equally distribute the load.

There are also many variables to the construction of a busway system, including varying floor heights, varying weights of horizontal runs on each floor, and weights of varying plug in units for each supported section of the riser. Without a good understanding of how this transfer loading impacts the ability of the spring system to respond to building changes, the installer can place the busway riser in a condition that results in distortion of the riser over time due to some hangers being over loaded and other hangers being under loaded. This can lead to decreased safety or efficiency, or both, of the electrical system. Thus, equal distribution of the load is necessary between the hangers to remove excessive load on the lower sections of the riser. However, when the springs of the hangers are always in the loaded state, as in during construction/installation, maintaining equal distribution becomes difficult.

Additionally, many customer maintenance practices do not perform annual monitoring as recommended by the busway manufacturers to ensure the riser hangers are optimally set after change in the installation conditions, such as the aforementioned expansion/contraction and shrinkages. It is also desirable that future maintenance/adjustment concerns be able to be addressed without reference to the original installation documents which may be unavailable by the time maintenance is required.

Thus, a need exists for an improved way to install a busway riser with spring hangers and to maintain optimal performance of the busways over time.

SUMMARY OF THE DISCLOSED EMBODIMENTS

The embodiments disclosed herein are directed to apparatus, methods and systems for installing and maintaining a busway and particularly, the vertical portion of such busway, often known as the riser.

The disclosed embodiments provide for a busway riser spring hanger having rigid elements in the hanger which allow spring compression of the hanger springs to be set and held before attachment to the busway section, and to hold the selected spring compression during assembly of busway sections into the riser. It is desirable for all spring compression settings to be equal to uniformly support the busway. A busway vertical spring hanger of the present invention, having the rigid elements, allows for advance calculation of the spring settings and factory setting of the hanger springs before shipment to the job site. The riser can then be built with the dimensions rigidly set and the spring settings all being desirably equal along the length of the riser. The rigid setting of the spring hangers can be released after the busway and its plug-in unit installation is complete.

Particularly the embodiments disclose a vertical spring hanger for a busway vertical riser stack, comprising: a) an upper bracket and a lower bracket extending in an X axis with first and second threaded rods therebetween extending in a Y axis, b) the first threaded rod affixed to the lower bracket and extending from the lower bracket through a hole in the upper bracket and having a first nut thereon located beneath the upper bracket for setting a distance between the upper bracket and the lower bracket when abutting the first nut to a bottom surface of the upper bracket; c) the second threaded rod affixed to the lower bracket and extending from the lower bracket through a second hole in the upper bracket and being surrounded by a compression spring between the brackets, and having a Second nut located thereon above the upper bracket for fixing the distance between the upper bracket and the lower bracket in conjunction with the first nut, when abutting a top surface of the upper bracket; and the second threaded rod further having a third nut thereon located beneath the spring for adjustably setting a spring load between the upper bracket and the lower bracket by forcing the spring upward toward a bottom surface of the upper bracket; and the first threaded rod having no spring surrounding it. The hanger will further include provision for attaching the lower bracket to a building structure, e.g. bolt holes; and provision for attaching the upper bracket to a busway section, e.g. clamps attached to the upper bracket.

Some embodiments of the present invention further include an indicator comprising a scale placeable on the bottom bracket of the hanger, which is fixed to the building, and an index mark placed through a cutout in the bottom bracket, onto the busway section, facing the scale. Both the scale and the index mark are placed when installation is complete, thereby providing a method to monitor movement of the busway relative to the building without the use of measuring tools.

In some embodiments a pair of mirror-image hanging brackets may be used at each support location of the riser with one bracket attached to each of opposing sides of the busway section to further facilitate support of the riser.

BRIEF DESCRIPTION OF THE DRAWINGS

The foregoing and other advantages of the disclosed embodiments will become apparent upon reading the following detailed description and upon reference to the exemplary explanatory drawings offered to illustrate the invention according to one or more embodiments disclosed herein, wherein.

DETAILED DESCRIPTION OF THE DISCLOSED EMBODIMENTS

Figure 1:
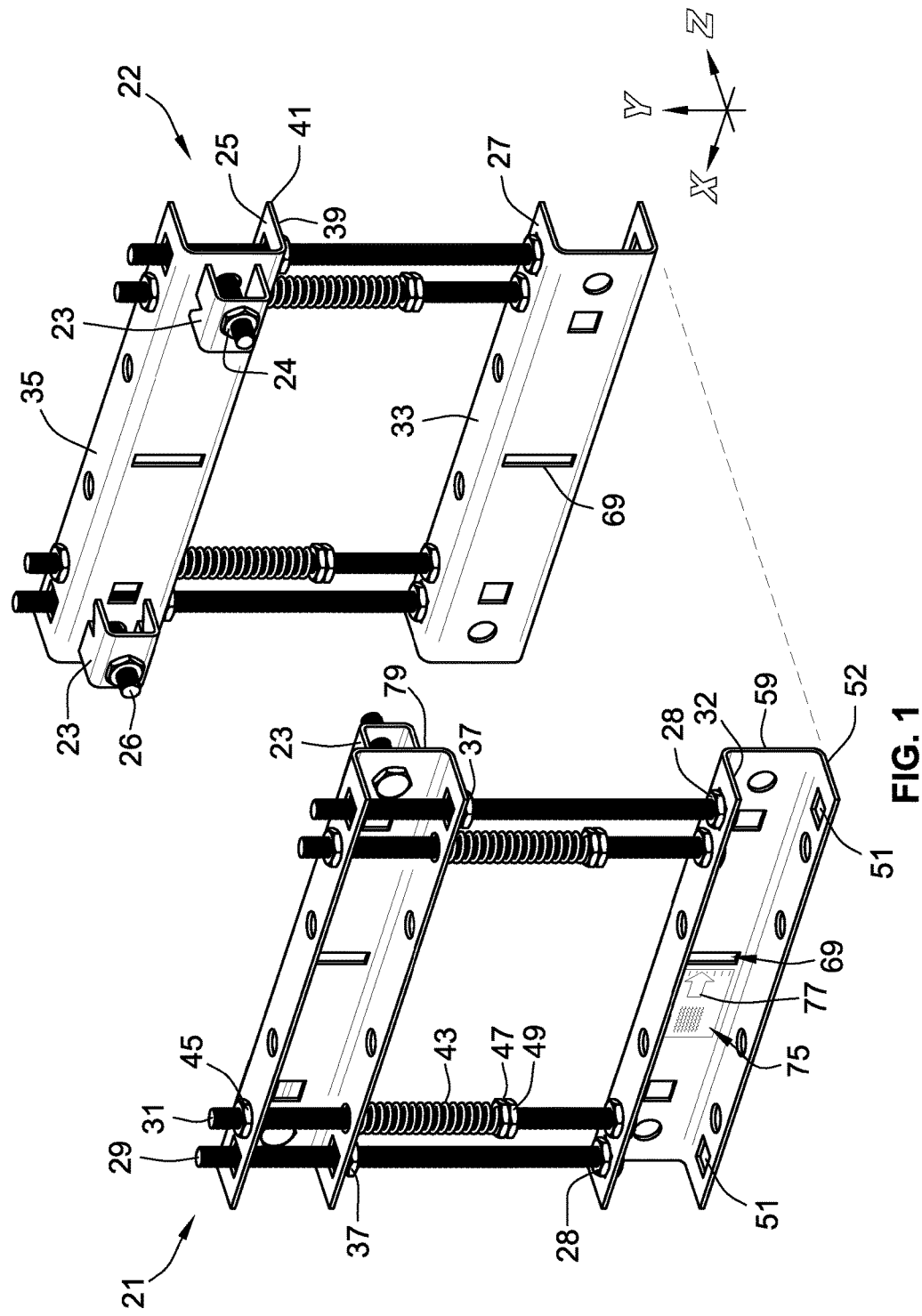
FIG. 1. shows an upper right perspective view of a pair of vertical spring hangers of the present invention with mounting apparatus for a busway section.

As an initial matter, it will be appreciated that the development of an actual, real commercial application incorporating aspects of the disclosed embodiments will require many implementation specific decisions to achieve the developer's ultimate goal for the commercial embodiment. Such implementation specific decisions may include, and likely are not limited to, compliance with system related, business related, government related and other constraints, which may vary by specific implementation, location and from time to time. While a developer's efforts might be complex and time consuming in an absolute sense, such efforts would nevertheless be a routine undertaking for those of skill in this art having the benefit of this disclosure.

It should also be understood that the embodiments disclosed and taught herein are susceptible to numerous and various modifications and alternative forms. Thus, the use of a singular term, such as, but not limited to, "a" and the like, is not intended as limiting of the number of items. Similarly, any relational terms, such as, but not limited to, "top," "bottom," "left," "right," "upper," "lower," "down," "up," "side," and the like, used in the written description are for clarity in specific reference to the drawings and are not intended to limit the scope of the invention.

Referring now to FIG. 1 through FIG. 4, a busway vertical spring hanger 21, and its mirror-image complement 22, according to one embodiment of the invention are shown in a front perspective view, front elevation, and top view, respectively. Numbering references of the component parts may be placed on either hanger for ease of viewing since the two hangers 21, 22 are identical in all respects except position, even though the identical hangers may be discussed in the singular for ease of explanation.

The vertical spring hanger includes brackets extending in an X axis including an upper bracket 25, shown as an C-bracket, and a lower bracket 27, shown as an C-bracket, with at least one pair of first and second threaded rods 29, 31, respectively, therebetween extending in a Y axis. While shown as C-brackets, other shapes of bracket may be considered suitable in certain applications. The first threaded rod 29 is affixed, such as by nuts or welding, to at least the upper surface 33 of the lower bracket 27. As illustrated, there are two nuts 28, 30 securing the first threaded rod 29 to the upper shelf 32 of lower bracket 27. The first threaded rod 29 extends from the lower bracket 27 through a hole in the upper bracket 25 to a point above the upper surface 35 of the upper bracket 25. The first threaded rod 29 lacks any spring component and has a first nut 37 thereon located on the underside 39 of the upper bracket 25, i.e. beneath the lower shelf 41 of the C-shaped upper bracket 25, for setting a distance between the upper bracket 25 and the lower bracket 27 when abutting the first nut 37 to the bottom surface 39 of the upper bracket 25. The first threaded rod 29, first nut 37, and a second nut 45 on the second threaded rod 31, supply the rigid elements to set and retain the spring compression of the hanger 21, as further explained below.

Figure 3:
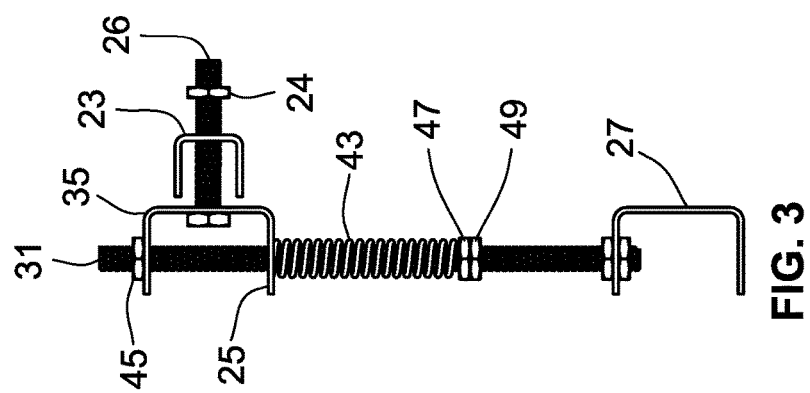
FIG. 3 is a side view of the second rod of the spring hanger and its spring.

As seen particularly in FIG. 3, the second threaded rod 31 is also affixed to the lower bracket 27 and extends from the lower bracket through a second set of holes in the upper bracket 25 to a point above the upper surface 35 of the upper bracket 25. The second threaded rod 31 is surrounded by a compression spring 43 between the brackets 25, 27. The second threaded rod 31 has a second nut 45 located thereon above the upper bracket 25 for fixing the distance between the upper bracket 25 and the lower bracket 27, in conjunction with the first nut 37 on the first rod 29, when abutting the upper surface 35 of the upper bracket 25.

Figure 4:
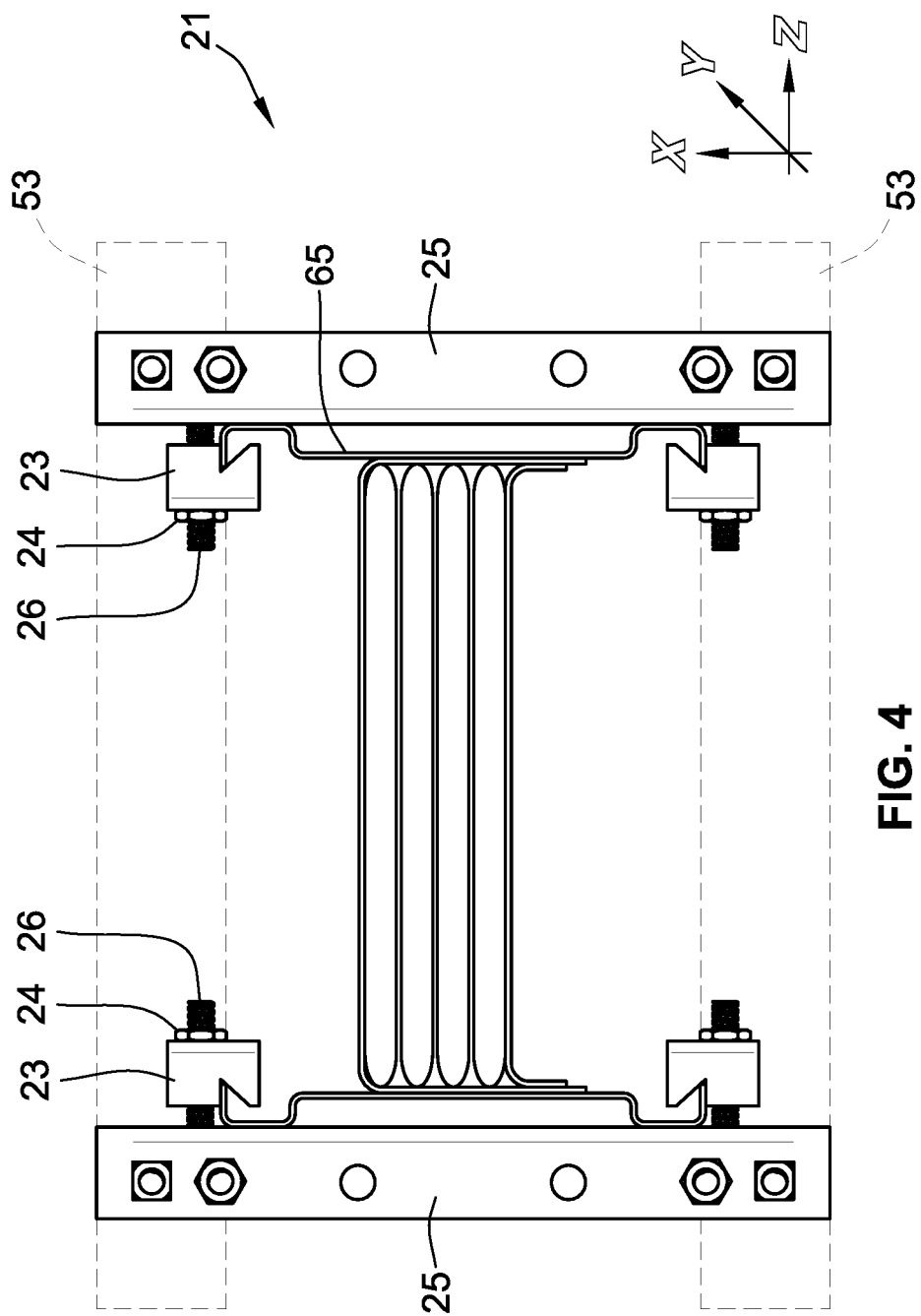
FIG. 4 is a top view of a pair of spring hangers of the present invention with a busway section attached and a pair of channel irons for attachment to a building floor.

The second threaded rod 31 further has a third nut 47 thereon located beneath the spring 43 for adjustably setting a spring load between the upper bracket 25 and the lower bracket 27 by forcing the spring 43 upward toward a bottom surface 39 of the upper bracket 25. A fourth nut 49 can be on the second threaded rod 31 beneath the third nut 47 to support it, prevent downward travel of the third nut 47, and limit any loosening, if needed. As best seen in FIG. 4, busway clamps, collectively 23, which are slotted to mechanically grip the inside edge of the case of the busway section 65 in known fashion, are mounted on clamp bolts 26 extending from the upper bracket 25. The busway clamps 23 are adjusted toward the upper bracket 25 and held by clamp nuts 24 on the clamp bolts 26 to secure the busway section 65 to the busway vertical spring hanger 21.

Figure 2:
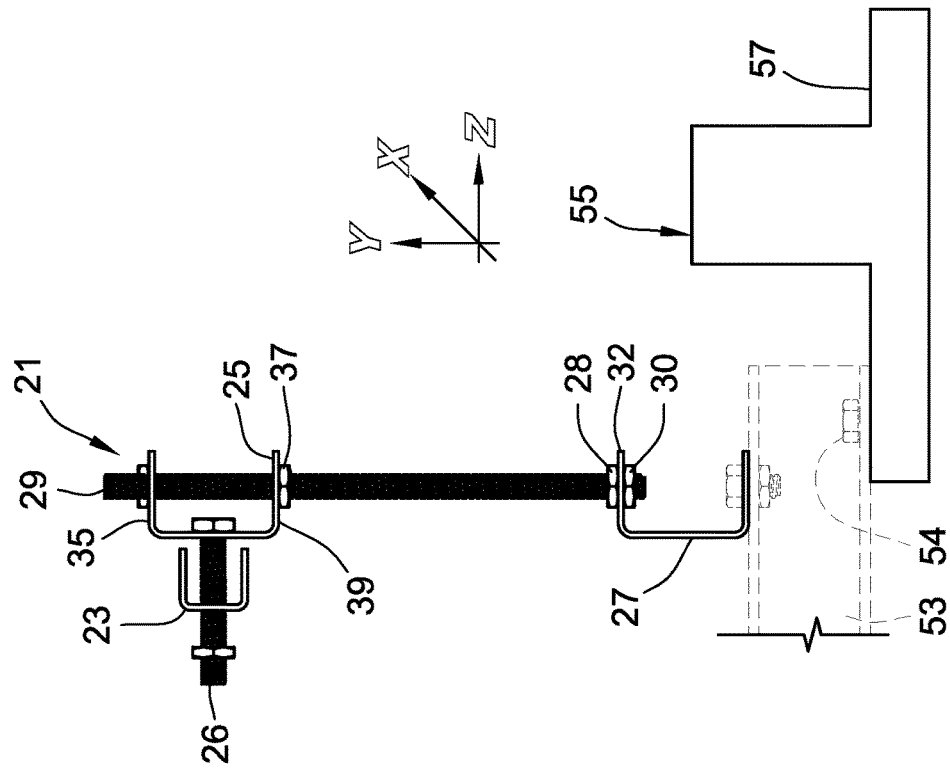
FIG. 2 is a side view of a spring hanger of the present invention shown mounted on a channel iron (in phantom) to a building floor without a busway section attached.

Referring especially to FIGS. 1 and 2, the lower bracket 27 is equipped with provisions for attaching the lower bracket 27 to a building structure. Bolt holes, collectively 51 (FIG. 1), are placed in the lower shelf 52 of the C-shaped lower bracket 27 to allow bolting of the lower bracket 27 to a channel iron 53 (in phantom at FIG. 2), which is in-turn bolted, as at ref no. 54, to the rain gutter 55 of the building floor 57 to provide attachment of the hanger 21 to the building, as will be understood by the person of ordinary skill in the art. The term "provisions for" is not meant to be limiting and may indicate a direct attachment or an indirect attachment, and with or without the ultimate fastening hardware, as shown, for the hanger 21.

Figure 5:
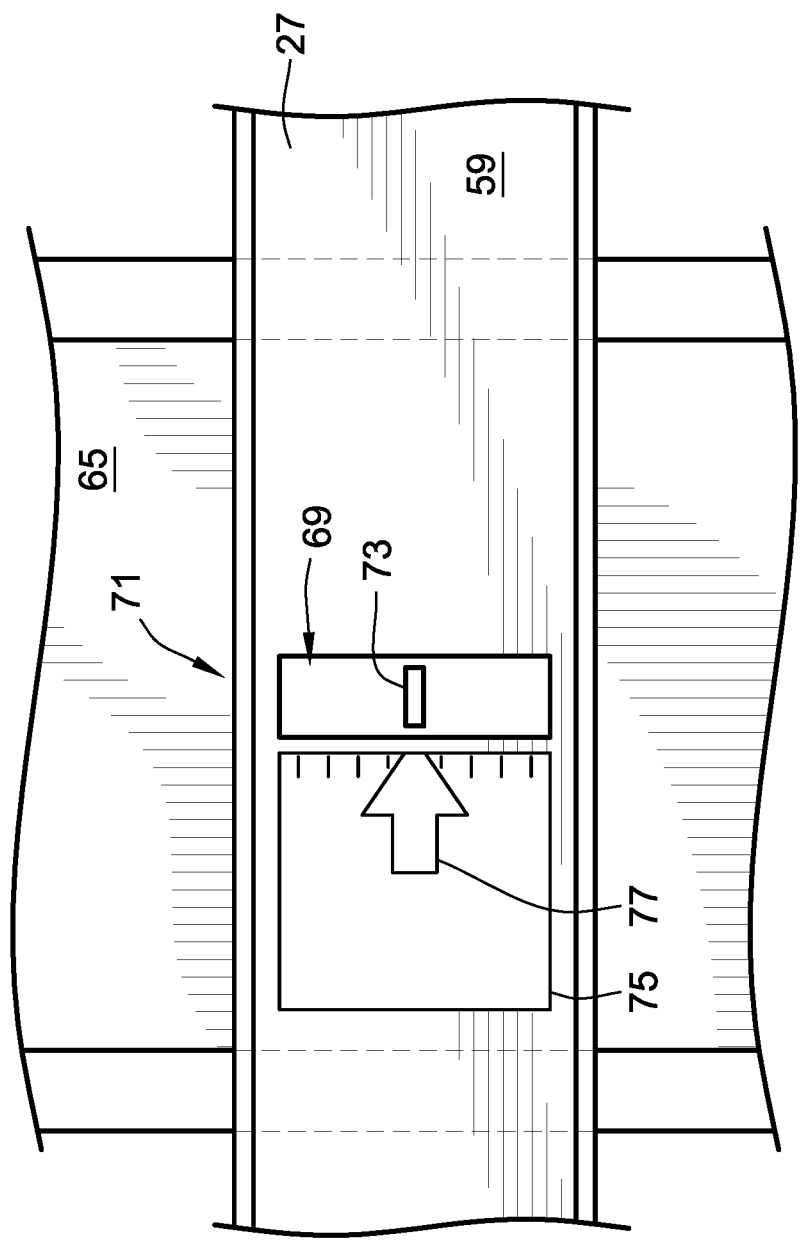
FIG. 5 is a front detail view of an indicator apparatus at the lower bracket of a hanger with an index mark installed on the associated busway section.

Also, as best seen in FIG. 1 and FIG. 5, an open space 69 is cut out of the lower bracket vertical surface 59 to provide an indicator 71 including an index mark 73 placed on the busway section 65 and a indicator scale 75 with an arrow label 77 attached to the vertical surface 59, as further explained below.

Once the busway design is set, a load calculation formula can be used to accurately determine the total weight of all busway and plug-in units relative to the building dimensions, floor spacing and plug-in units on each floor, to establish a common spring compression height for all spring hangers in the riser. The spring compression can then be established at the factory and sent to the job site without the need for ad hoc adjustments by the installer as in the current methodology.

The rigid elements, as represented by first rod 29, first nut 37 and second nut 45; in the hanger design allow the spring hanger 21 to be installed with the busway as each section is placed into the building, holding each section and the total riser in place. All rigidly held hangers remain in place until all busway is installed, the plug-in units are connected, and conduit is in place. Before releasing the rigid elements, the indicator scale is placed on the lower bracket and an index mark is placed through the cutout onto the busway section opposite the indicator arrow. The indicator can then provide an easy method to monitor building change relative to the riser without the use of measuring equipment or the need to come in contact with the busway. Corrective action requirements for the riser support can be evaluated and planned for scheduled maintenance during shutdown events. The rigid elements of the spring hangers are released after the busway and plug-in unit installation is complete by starting at the top of the riser and raising the second nut 45 and lowering the first nut 37 on each spring hanger and working downward.

While particular aspects, implementations, and applications of the present disclosure have been illustrated and described, it is to be understood that the present disclosure is not limited to the precise construction and compositions disclosed herein and that various modifications, changes, and variations may be apparent from the foregoing descriptions without departing from the scope of the disclosed embodiments as defined in the appended claims.

The invention claimed is:

1. A vertical spring hanger for a busway vertical riser stack, the vertical spring hanger comprising:
 a) an upper bracket and a lower bracket extending in an X axis with first and second threaded rods therebetween extending in a Y axis;
 b) the first threaded rod affixed to the lower bracket and extending from the lower bracket through a hole in the upper bracket and having a first nut thereon located beneath the upper bracket for setting a distance between the upper bracket and the lower bracket when abutting the first nut to a bottom surface of the upper bracket;
 c) the second threaded rod affixed to the lower bracket and extending from the lower bracket through a second hole in the upper bracket and being surrounded by a compression spring between the lower bracket and the upper bracket, and having a second nut located thereon above the upper bracket for fixing the distance between the upper bracket and the lower bracket in conjunction with the first nut, when abutting a top surface of the upper bracket;
 and the second threaded rod further having a third nut thereon located beneath the spring for adjustably setting a spring load between the upper bracket and the lower bracket by forcing the spring upward toward the bottom surface of the upper bracket; and
 the first threaded rod having no spring surrounding it; and
 bolt holes in the lower bracket for attaching the lower bracket to a building structure.

2. The vertical spring hanger of claim 1, wherein the upper bracket is a C-bracket.

3. The vertical spring hanger of claim 1, wherein the lower bracket is a C-bracket.

4. The vertical spring hanger of claim 1, further comprising provision for attaching the upper bracket to a busway section.

5. The vertical spring hanger of claim 4, wherein the provision for attaching the upper bracket includes a busway clamp extending from the upper bracket by a bolt.

6. The vertical spring hanger of claim 1, further comprising a fourth nut being underneath the third nut for preventing downward travel of the third nut.

7. The vertical spring hanger of claim 1, further comprising an indicator scale on the lower bracket and a cut-out on the lower bracket.

8. The vertical spring hanger of claim 7, further comprising an index mark on a busway section visible through the cut-out in the lower bracket.

9. A vertical spring hanger for a busway vertical riser stack, the vertical spring hanger comprising:
 a) an upper bracket and a lower bracket extending in an X axis with first and second threaded rods therebetween extending in a Y axis;
 b) the first threaded rod affixed to the lower bracket and extending from the lower bracket through a hole in the upper bracket and having a first nut thereon located beneath the upper bracket for setting a distance between the upper bracket and the lower bracket when abutting the first nut to a bottom surface of the upper bracket;
 c) the second threaded rod affixed to the lower bracket and extending from the lower bracket through a second hole in the upper bracket and being surrounded by a compression spring between the lower bracket and the upper bracket, and having a second nut located thereon above the upper bracket for fixing the distance between the upper bracket and the lower bracket in conjunction with the first nut, when abutting a top surface of the upper bracket;
 and the second threaded rod further having a third nut thereon located beneath the spring for adjustably setting a spring load between the upper bracket and the lower bracket by forcing the spring upward toward the bottom surface of the upper bracket; and
 the first threaded rod having no spring surrounding it; and
 an indicator scale on the lower bracket and a cut-out on the lower bracket.

10. The vertical spring hanger of claim 9, wherein the upper bracket is a C-bracket.

11. The vertical spring hanger of claim 9, wherein the lower bracket is a C-bracket.

12. The vertical spring hanger of claim 9, further comprising provision for attaching the lower bracket to a building structure.

13. The vertical spring hanger of claim 12, wherein the provision for attaching the lower bracket is bolt holes in the lower bracket.

14. The vertical spring hanger of claim 9, further comprising provision for attaching the upper bracket to a busway section.

15. The vertical spring hanger of claim 14, wherein the provision for attaching the upper bracket includes a busway clamp extending from the upper bracket by a bolt.

16. The vertical spring hanger of claim 9, further comprising a fourth nut being underneath the third nut for preventing downward travel of the third nut.

17. The vertical spring hanger of claim 9, further comprising an index mark on a busway section visible through the cut-out in the lower bracket.

18. A vertical spring hanger for a busway vertical riser stack, the vertical spring hanger comprising:
 a) an upper bracket and a lower bracket extending in an X axis with first and second threaded rods therebetween extending in a Y axis;
 b) the first threaded rod affixed to the lower bracket and extending from the lower bracket through a hole in the upper bracket and having a first nut thereon located beneath the upper bracket for setting a distance between the upper bracket and the lower bracket when abutting the first nut to a bottom surface of the upper bracket;

c) the second threaded rod affixed to the lower bracket and extending from the lower bracket through a second hole in the upper bracket and being surrounded by a compression spring between the lower bracket and the upper bracket, and having a second nut located thereon above the upper bracket for fixing the distance between the upper bracket and the lower bracket in conjunction with the first nut, when abutting a top surface of the upper bracket;

and the second threaded rod further having a third nut thereon located beneath the spring for adjustably setting a spring load between the upper bracket and the lower bracket by forcing the spring upward toward the bottom surface of the upper bracket; and the first threaded rod having no spring surrounding it; and a busway clamp for attaching the upper bracket to a busway, the busway clamp extending from the upper bracket by a bolt perpendicular to the first and second threaded rods.

* * * * *